US009769430B1

(12) United States Patent
Bechtel et al.

(10) Patent No.: US 9,769,430 B1
(45) Date of Patent: Sep. 19, 2017

(54) IMAGER SYSTEM WITH MEDIAN FILTER AND METHOD THEREOF

(75) Inventors: Jon H. Bechtel, Holland, MI (US);
Tom B. Sherman, Ada, MI (US);
Daniel G. McMillan, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 1282 days.

(21) Appl. No.: 13/530,947

(22) Filed: Jun. 22, 2012

Related U.S. Application Data

(60) Provisional application No. 61/544,315, filed on Oct. 7, 2011, provisional application No. 61/500,418, filed on Jun. 23, 2011.

(51) Int. Cl.
*H04N 7/18* (2006.01)
*H04N 5/374* (2011.01)

(52) U.S. Cl.
CPC .................... *H04N 7/183* (2013.01)

(58) Field of Classification Search
CPC ............ H04N 5/2355; H04N 2209/046; G06T 2207/20208; B60R 1/04
See application file for complete search history.

(56) References Cited

U.S. PATENT DOCUMENTS

| | | |
|---|---|---|
| 4,630,307 A | 12/1986 | Cok |
| 5,717,791 A | 2/1998 | Labaere et al. |
| 5,805,217 A | 9/1998 | Lu et al. |
| 5,848,189 A * | 12/1998 | Pearson et al. ............... 382/218 |
| 5,892,541 A | 4/1999 | Merrill |
| 6,091,862 A | 7/2000 | Okisu |
| 6,175,383 B1 | 1/2001 | Yadid-Pecht |
| 6,229,578 B1 | 5/2001 | Acharya et al. |
| 6,396,505 B1 | 5/2002 | Lui et al. |
| 6,466,333 B1 | 10/2002 | Schoolcraft et al. |
| 6,542,187 B1 * | 4/2003 | Hamilton et al. ............ 348/234 |
| 6,570,616 B1 | 5/2003 | Chen |

(Continued)

FOREIGN PATENT DOCUMENTS

| | | |
|---|---|---|
| JP | 10-051693 | 2/1998 |
| JP | 2000048183 | 2/2000 |

(Continued)

OTHER PUBLICATIONS

Sung-Hyun Yang & Kyoung-Rok Cho, High Dynamic Range CMOS Image Sensor with Conditional Reset, IEEE 2002 Custom Integrated Circuits Conf pp. 265-268, Cheongju Chungbuk, Korea.

(Continued)

*Primary Examiner* — Obafemi Sosanya
(74) *Attorney, Agent, or Firm* — Price Heneveld LLP; Bradley D. Johnson

(57) ABSTRACT

An imaging system configured to display a captured image on a display having a lower dynamic range than the imaging system is provided, wherein the imaging system includes a high dynamic range imager configured to capture at least one high dynamic range image, and a processing device communicatively connected to the high dynamic range imager, wherein the processing device is configured to reduce color speckles caused by errant interpolated pixel values and reduce occurrence of errant values of alternate color while maintaining at least one of sharpness detail, edge detail, and generate smoothing color rendering in a displayed image.

28 Claims, 7 Drawing Sheets

(56) References Cited

U.S. PATENT DOCUMENTS

| | | |
|---|---|---|
| 6,628,330 B1 | 9/2003 | Lin |
| 6,744,916 B1 | 6/2004 | Takahashi |
| 6,765,619 B1 | 7/2004 | Deng et al. |
| 6,774,988 B2 | 8/2004 | Stam et al. |
| 6,791,609 B2 | 9/2004 | Yamauchi et al. |
| 6,831,689 B2 | 12/2004 | Yadid-Pecht |
| 6,928,196 B1 | 8/2005 | Bradley et al. |
| 6,933,971 B2 | 8/2005 | Bezryadin |
| 6,963,369 B1 | 11/2005 | Olding |
| 6,993,200 B2 | 1/2006 | Tastl et al. |
| 7,010,174 B2 | 3/2006 | Kang et al. |
| 7,103,260 B1 | 9/2006 | Hinson |
| 7,142,723 B2 | 11/2006 | Kang et al. |
| 7,146,059 B1 | 12/2006 | Durrand et al. |
| 7,149,369 B2 | 12/2006 | Atkins |
| 7,202,463 B1 | 4/2007 | Cox |
| 7,239,757 B2 | 7/2007 | Kang et al. |
| 7,292,725 B2 | 11/2007 | Chen et al. |
| 7,305,144 B2 | 12/2007 | Fattal et al. |
| 7,317,843 B2 | 1/2008 | Sun et al. |
| 7,362,355 B1 | 4/2008 | Yang et al. |
| 7,362,897 B2 | 4/2008 | Ishiga |
| 7,376,288 B2 | 5/2008 | Huang et al. |
| 7,408,136 B2 | 8/2008 | Bechtel et al. |
| 7,454,136 B2 | 11/2008 | Raskar et al. |
| 7,483,486 B2 | 1/2009 | Mantiuk et al. |
| 7,492,375 B2 | 2/2009 | Toyama et al. |
| 7,502,505 B2 | 3/2009 | Malvar et al. |
| 7,519,907 B2 | 4/2009 | Cohen et al. |
| 7,567,291 B2 | 7/2009 | Bechtel et al. |
| 7,653,240 B1 | 1/2010 | Otobe et al. |
| 7,663,631 B1 | 2/2010 | Friedman et al. |
| 7,714,900 B2 | 5/2010 | Chiu |
| 7,783,121 B1 | 8/2010 | Cox |
| 7,859,565 B2 | 12/2010 | Schofield et al. |
| 7,876,926 B2 | 1/2011 | Schwartz et al. |
| 7,876,957 B2 | 1/2011 | Ovsiannikov et al. |
| 7,881,496 B2 | 2/2011 | Camilleri et al. |
| 7,881,497 B2 | 2/2011 | Ganguli et al. |
| 7,881,839 B2 | 2/2011 | Stam et al. |
| 7,881,848 B2 | 2/2011 | Hayakawa et al. |
| 7,885,766 B2 | 2/2011 | Sugimoto et al. |
| 7,889,887 B2 | 2/2011 | Azuma |
| 7,889,949 B2 | 2/2011 | Cohen et al. |
| 7,890,231 B2 | 2/2011 | Saito et al. |
| 7,898,182 B2 | 3/2011 | Futamura |
| 7,898,400 B2 | 3/2011 | Hadi et al. |
| 7,899,213 B2 | 3/2011 | Otsuka et al. |
| 7,903,841 B2 | 3/2011 | Similansky |
| 7,903,843 B2 | 3/2011 | Sawaki et al. |
| 7,904,247 B2 | 3/2011 | Nakamori |
| 7,948,543 B2 | 5/2011 | Watanabe |
| 7,983,511 B1 * | 7/2011 | Chan ............... G06K 9/40 382/266 |
| 8,842,884 B2 * | 9/2014 | Klein ............... G06K 9/00798 382/104 |
| 2002/0186309 A1 | 12/2002 | Keshet et al. |
| 2003/0011708 A1 | 1/2003 | Kawamura et al. |
| 2003/0058346 A1 | 3/2003 | Bechtel et al. |
| 2004/0161145 A1 | 8/2004 | Embler |
| 2005/0141047 A1 | 6/2005 | Watanabe |
| 2005/0174452 A1 | 8/2005 | Van Blerkom et al. |
| 2005/0200733 A1 | 9/2005 | Malvar |
| 2005/0270391 A1 | 12/2005 | Watanabe |
| 2006/0011810 A1 | 1/2006 | Ando et al. |
| 2006/0104505 A1 | 5/2006 | Chen et al. |
| 2006/0139470 A1 | 6/2006 | McGowan |
| 2006/0181625 A1 | 8/2006 | Han et al. |
| 2006/0215882 A1 | 9/2006 | Ando et al. |
| 2006/0279585 A1 * | 12/2006 | Milanfar ............... G06T 3/4015 345/694 |
| 2007/0002154 A1 | 1/2007 | Kang et al. |
| 2007/0064118 A1 * | 3/2007 | Mishina ............... 348/222.1 |
| 2007/0110300 A1 | 5/2007 | Chang et al. |
| 2007/0257998 A1 | 11/2007 | Inoue |
| 2008/0055441 A1 | 3/2008 | Altice |
| 2008/0068520 A1 | 3/2008 | Minikey, Jr. et al. |
| 2008/0136953 A1 | 6/2008 | Barnea et al. |
| 2008/0192132 A1 | 8/2008 | Bechtel et al. |
| 2008/0192819 A1 | 8/2008 | Ward et al. |
| 2009/0160987 A1 | 6/2009 | Bechtel et al. |
| 2009/0190015 A1 | 7/2009 | Bechtel et al. |
| 2009/0244333 A1 | 10/2009 | Lukac |
| 2009/0256938 A1 * | 10/2009 | Bechtel ............... H04N 5/374 348/302 |
| 2010/0061625 A1 | 3/2010 | Lukac |
| 2010/0177203 A1 | 7/2010 | Lin |
| 2010/0187407 A1 | 7/2010 | Bechtel et al. |
| 2010/0188540 A1 | 7/2010 | Bechtel et al. |
| 2010/0302384 A1 | 12/2010 | Sawada et al. |
| 2011/0285849 A1 | 11/2011 | Schofield et al. |
| 2012/0053795 A1 | 3/2012 | Bos et al. |
| 2012/0148155 A1 * | 6/2012 | Lesellier ............... G06T 5/009 382/169 |

FOREIGN PATENT DOCUMENTS

| | | |
|---|---|---|
| JP | 2005-160044 | 6/2005 |
| JP | 2008-092052 | 4/2008 |
| WO | WO0017009 | 3/2000 |
| WO | WO0109717 | 2/2001 |
| WO | WO03066432 | 8/2003 |

OTHER PUBLICATIONS

C. Tomasi & R. Manduchi, Bilateral Filtering for Gray and Color Images, Proceedings of the 1998 IEEE International Conference on Computer Vision, Bombay, India.

"New Edge-Directed Interpolation," Xin Li et al, IEEE Transactions on Image Processing. vol. 10. No. 10. Oct. 2001 1521-1527.

"Demosaicing: Image Reconstruction from Color CCD Samples," Ron Kimmel, IEEE Transactions on Image Processing. vol. 8. No. 9. Sep. 1999, pp. 1221-1228.

* cited by examiner

Fig. 2

202 ~ Horizontal
H

201 ~ Vertical
V

200 ~ Non-Directional & Diagonal
N

Cross

Cross (Alt)

$200$ ~ For Non-Directional (N)*: IF ( ( ( $C_{02} < K * G_{12}$ ) AND ( $C_{20} < K * G_{21}$ ) AND ( $C_{24} < K * G_{23}$ ) AND ( $C_{42} < K * G_{32}$ ) )

Cross ~ THEN ( $G_{22} = ( G_{12} + G_{12} + G_{12} ) / 4 + ( 4 * C_{22} - C_{02} - C_{20} - C_{24} - C_{42} ) / 8$ ) )

Cross (Alt) ~ ELSE ( $G_{22} = ( G_{12} + G_{21} + G_{23} + G_{32} ) / 4$ )

$201$ ~ For Vertical (V):   IF ( ( ( $C_{02} < K * G_{12}$ ) AND ( $C_{42} < K * G_{32}$ ) )

Cross ~ THEN ( $G_{22} = ( G_{12} + G_{32} ) / 2 + ( 2 * C_{22} - C_{02} - C_{42} ) / 4$ ) )

Cross (Alt) ~ ELSE ( $G_{22} = ( G_{12} + G_{32} ) / 2$ )

$202$ ~ For Horizontal (H):   IF ( ( ( $C_{20} < K * G_{21}$ ) AND ( $C_{24} < K * G_{23}$ ) )

Cross ~ THEN ( $G_{22} = ( G_{21} + G_{23} ) / 2 + ( 2 * C_{22} - C_{20} - C_{24} ) / 4$ ) )

Cross (Alt) ~ ELSE ( $G_{22} = ( G_{21} + G_{23} ) / 2$ )

*Note: May also be used for Diagonal up (UR) and Diagonal down (DR).

Fig. 3

$BL^* = (\min(P9, P8, P7, P6, P5, P4, P3, P2, P1, P0) > K1 * \max(P9, P8, P7, P6, P5, P4, P3, P2, P1, P0))$ or
  ( Pixel value $< K2$ ) or ( Pixel value $> K3$ ) or (Unexpected range indication set for pixel ) ~501

$Bij = 1$ when $Pi > Pj$ ~502

$Bii = 0$ (Optionally, $Bii = 1$) ~503

$\min(P9, P8, P7, P6, P5, P4, P3, P2, P1, P0) = Pi(\min)$ where $i(\min)$ equals the value of i where for all $j \neq i$ $Bij = 0$
$\max(P9, P8, P7, P6, P5, P4, P3, P2, P1, P0) = Pi(\max)$ where $i(\max)$ equals the value of i where for all $j \neq i$ $Bij = 1$  ~504

$Bji = \text{not}(Bij)$ for $i \neq j$ ~ 506 ~505

$KEYi = (Bi9, Bi8, Bi7, Bi6, Bi5, Bi4, Bi3, Bi2, Bi1, Bi0)$ ~507
(G9, G8, G7, G6, G5, G4, G3, G2, G1, G0) = KEYi ~508

$NBi = (Bi2, Bi4, Bi6, Bi8, Bi5) \neq 00000$ or $11111$ ~509

$Vi = \text{not}((Bi2 \text{ xor } Bi1)$ or $(Bi4 \text{ xor } Bi3)$ or $(Bi6 \text{ xor } Bi7)$ or $(Bi8 \text{ xor } Bi9)$ or $(Bi5 \text{ xor } Bi6))$ and NBi ~510

$Hi = \text{not}((Bi2 \text{ xor } Bi7)$ or $(Bi4 \text{ xor } Bi9)$ or $(Bi6 \text{ xor } Bi1)$ or $(Bi8 \text{ xor } Bi3)$ or $(Bi5 \text{ xor } Bi0))$ and NBi ~511

$MEi = ((Bi2, Bi4, Bi6, Bi8, Bi5) = \text{binary } 01010)$ and Hi ~512

$CMEi = ((Bi2, Bi4, Bi6, Bi8, Bi5) = \text{binary } 10101)$ and Hi ~513

$ME^{**} = ME0$ or ME1 or ME2 or ME3 or ME4 or ME5 or ME6 or ME7 or ME8 or ME9 ~ 514

$CME^{**} = CME0$ or CME1 or CME2 or CME3 or CME4 or CME5 or CME6 or CME7 or CME8 or CME9 ~ 515

$H = (H0$ or H1 or H2 or H3 or H4 or H5 or H6 or H7 or H8 or H9) and not (ME or CME or BL) ~516

$V = (V1$ or V2 or V3 or V4 or V5 or V6 or V7 or V8 or V9) and not (ME or CME or BL) ~517

$CMEi = ((Bi2, Bi4, Bi6, Bi8, Bi5) = \text{binary } 10101)$ and Hi ~518

Priority green pixel location (Highest to lowest): BL, (ME or CME), H, V, N ~ 519

$URNGi = \text{not}(( Bi6 \text{ xor } Bi4)$ or $( Bi1 \text{ xor } Bi3 ))$ and $( Bi4 \text{ xor } Bi3)$ ~520

$URNG = ( URNG1$ or $URNG3$ or $URNG4$ or $URNG6)$ ~521

$DRNGi = \text{not}(( Bi4 \text{ xor } Bi1)$ or $( Bi3 \text{ xor } Bi6 ))$ and $( Bi4 \text{ xor } Bi3 )$ ~ 522

$DRNG = (DRNG1$ or $DRNG3$ or $DRNG4$ or $DRNG6)$ ~523

Priority non-green pixel location (Highest to lowest): BL, (ME or CME), H, V, URNG, DRNG, N ~ 524

*For example: $K1 = 0.75$, $K2 = 32$, $K3 = 1$ million ($2^{20}$) with maximum pixel value of about 16 million.

**A previously disclosed algorithm is preferably used to select an H (meH) or V (meV) indication for the interpolation for occurances of ME or CME

Fig. 5

IMAGER SYSTEM WITH MEDIAN FILTER AND METHOD THEREOF

CROSS-REFERENCE TO RELATED APPLICATIONS

This application claims the benefit of U.S. Provisional Application No. 61/500,418 filed on Jun. 23, 2011 by Jon H. Bechtel et al. and entitled "MEDIAN FILTER," and U.S. Provisional Application No. 61/544,315 filed on Oct. 7, 2011 by Jon H. Bechtel et al. and entitled "MEDIAN FILTER," the entire disclosures of which are incorporated herein by reference.

FIELD OF THE INVENTION

The present invention generally relates to a median filter, and more particularly to a median filter used in a system that displays an image captured by a high dynamic range imager.

SUMMARY OF THE INVENTION

According to one aspect of the present invention, an imaging system configured to display a captured image on a display having a lower dynamic range than the imaging system, the imaging system includes a high dynamic range imager configured to capture at least one high dynamic range image, and a processing device communicatively connected to the high dynamic range imager, wherein the processing device is configured to reduce color speckles caused by errant interpolated pixel values and reduce occurrence of errant values of alternate color while maintaining at least one of sharpness detail, edge detail, and generate smoothing color rendering in a displayed image.

According to another aspect of the present invention, imaging system configured to display a captured image on a display having a lower dynamic range than the imaging system, the imaging system including a high dynamic range imager configured to capture at least one high dynamic range image, and a processing device communicatively connected to the high dynamic range imager, wherein the processing device is configured to find a median from a set of pixel related values and provide an enhanced pixel metric based at least partially upon modified ratios of pixel color component to at least one of pixel color component and luminance values.

According to yet another aspect of the present invention, an imaging system configured to display a captured image on a display having a lower dynamic range than the imaging system, the imaging system includes a high dynamic range imager configured to capture at least one high dynamic range image, and a processing device communicatively connected to the high dynamic range imager, wherein the processing device is configured to rank each element of an array with respect to an ordering criterion and select a median element.

According to another aspect of the present invention, an imaging system configured to display a captured image on a display having a lower dynamic range than the imaging system, the imaging system includes a high dynamic range imager configured to capture at least one high dynamic range image, and a processing device communicatively connected to the high dynamic range imager, wherein the processing device is configured to filter successive pixels so pixel related values introduced into neighborhood of pixels over which a median or value of designated rank is chosen are used with related comparison results.

According to yet another aspect of the present invention, an imaging system configured to display a captured image on a display having a lower dynamic range than the imaging system, the imaging system includes a high dynamic range imager configured to capture at least one high dynamic range image, and a processing device communicatively connected to the high dynamic range imager, wherein the processing device is configured such that elements with equal values are sorted in a prescribed sequence so each element has a rank that is unique within a set.

According to another aspect of the present invention, a non-transitory computer readable medium having stored thereon software instructions that, when executed by a processor, cause the processor to display a captured image on a display having a lower dynamic range than the imaging system, by executing the steps including capturing at least one high dynamic range image, and reducing color speckles caused by errant interpolated pixel values and reduce occurrence of errant values of alternate color while maintaining at least one of sharpness detail, edge detail, and generate smoothing color rendering in a displayed image.

According to yet another aspect of the present invention, a non-transitory computer readable medium having stored thereon software instructions that, when executed by a processor, cause the processor to display a captured image on a display having a lower dynamic range than the imaging system, by executing the steps including capturing at least one high dynamic range image, and finding a median from a set of pixel related values and provide an enhanced pixel metric based at least partially upon modified ratios of pixel color component to at least one of pixel color component and luminance values.

According to another aspect of the present invention, a non-transitory computer readable medium having stored thereon software instructions that, when executed by a processor, cause the processor to display a captured image on a display having a lower dynamic range than the imaging system, by executing the steps including capturing at least one high dynamic range image, and ranking each element of an array with respect to an ordering criterion and select a median element.

According to yet another aspect of the present invention, a non-transitory computer readable medium having stored thereon software instructions that, when executed by a processor, cause the processor to display a captured image on a display having a lower dynamic range than the imaging system, by executing the steps including capturing at least one high dynamic range image, and filtering successive pixels so pixel related values introduced into neighborhood of pixels over which a median or value of designated rank is chosen are used with related comparison results.

According to another aspect of the present invention, a non-transitory computer readable medium having stored thereon software instructions that, when executed by a processor, cause the processor to display a captured image on a display having a lower dynamic range than the imaging system, by executing the steps including capturing at least one high dynamic range image, and sorting elements with equal values in a prescribed sequence so each element has a rank that is unique within a set.

According to yet another aspect of the present invention, a non-transitory computer readable medium having stored thereon software instructions that, when executed by a processor, cause the processor to display a captured image on a display having a lower dynamic range than the imaging system, by executing the steps including capturing at least one high dynamic range image, and using a second derivative term calculated from one of a red pixel and a blue pixel for interpolation of green pixel.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 2 is a diagram illustrating interpolation patterns and screening criteria for conditional inclusion of selected non-green pixel values in the calculation are detailed;

FIG. 3 is a diagram illustrating interpolation techniques, in accordance with one embodiment of the present invention;

FIG. 5 is a diagram illustrating a Bilinear (BL) classification, in accordance with one embodiment of the present invention;

DETAILED DESCRIPTION

Figure 1:
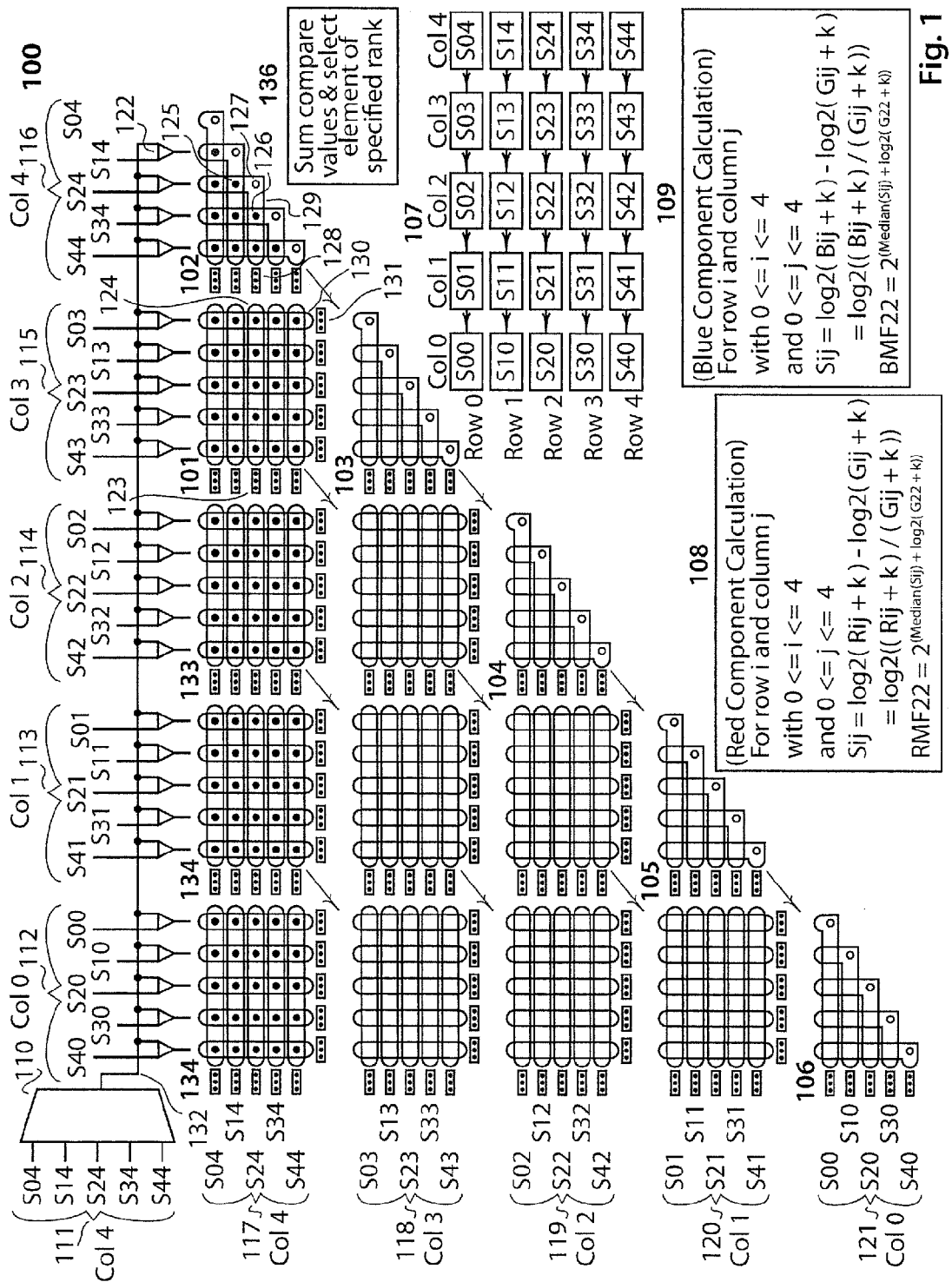
FIG. 1 is a diagram illustrating a median filter, in accordance with one embodiment of the present invention.

The present illustrated embodiments reside primarily in combinations of method steps and apparatus components related to a median filter. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With imaging devices adapted to render a color image of a scene, each individual pixel is normally provided with a color selective filter that has a color assigned in a prescribed pattern to pixels of the array. A Bayer pattern (named after its inventor) with a repeating pattern of color tiles is normally used and is characterized in consisting of square four pixel groups having diagonally positioned differently colored filters (normally red pass and blue pass) in opposing corners of a square array of four pixel color filters and like colored filters (normally green pass filters) in the remaining pair of opposing corners. Variants of the normal Bayer filter pattern as well as other filter patterns, for example, filter pattern arrays with other colors for the filters or with two diagonally opposing red filters and individual diagonally opposing green and blue filters are considered to be within the scope of the invention.

Light of the color passed by the color filter placed on each pixel is measured at that pixel location and the other color components for the pixel location are normally supplied by an interpolation process. With high dynamic range images, very high contrast edges that occur, for example, from specular reflections from a vehicle illuminated by direct sunlight normally contain some pixel values with large interpolation errors and these may show up as bright specks in the image that are often red or blue. Worse still, in video sequences, colors may alternate from red to blue appearing much like a distant emergency light. A median filter is applied to values calculated for individual pixels preferably using equations that indicate a relationship between color components of individual pixels in a neighborhood of the target pixel whose value is to be modified. The median value or other value of specified rank in a set of calculated values is located and selected from among the values calculated for the pixels in the specified neighborhood of the target pixel and the selected value is used to calculate a modified value for a specified color component or specified color components of the target pixel in the neighborhood. One such filter that serves to smooth color rendering and to eliminate many of the interpolated values that are seriously in error is described herein. The filter serves to reduce noticeable color speckles due to errant interpolated pixel values and to greatly reduce the occurrence of errant values of alternating color that are easily confused with emergency flashers while preserving sharpness and edge detail in the image and generally smoothing color rendering in the image.

Examples of designs are taught in co-pending United States Patent Application Publication Numbers US 2010/0195901 A1 and US 2010/0195908 A1, both entitled "DIGITAL IMAGE PROCESSING AND SYSTEMS INCORPORATING THE SAME," which are hereby incorporated herein by reference in their entirety. These exemplary designs have used arrays of compare values as a portion of an edge pattern detection circuit but these prior art designs have not applied such an array to establish ranking order to locate an element that is ranked at the middle or at another specified place in the array of ranked elements. A report from the Army Research Laboratory, Adelphi, Md. 20783-1197, entitled, Review of Bayer Pattern Color Filter Array (CFA) Demosaicing with New Quality Assessment Algorithms by Robert A. Maschal Jr., S. Susan Young, Joe Reynolds, Keith Krapels, Jonathan Fanning, and Ted Corbin ARL-TR-5061, January 2010, which is hereby incorporated herein by reference in its entirety, teaches the use of a median filter based on the median of the difference between red pixel color components and the green color component for each pixel in the neighborhood of a target pixel wherein the red component of the target pixel is modified to differ from its green component by the median value. A similar modification is made to the blue component of the target pixel using the median of the difference between blue pixel color components and the corresponding green color component for each pixel in the neighborhood of the target pixel.

The device as described herein provides an efficient way to find the median from a set of pixel related values and also provides an improved pixel metric based on modified ratios of pixel color component values. The ratio calculations are preferably performed using logarithmic representations of the color components.

The present invention includes a device based on a matrix of compare values that may be implemented using a field programmable gate array to efficiently determine the ranking of each element of an array in accordance with an ordering criterion and to then select the median element or another element of a specified rank. The ordering criterion preferably provides a unique discrete ordering of the values in the array so that even with various equal pixel values a discrete ranking value is assigned to every element of the array. It is preferable to base the discrete ranking of equal pixel values either on their order of entry into the array and/or on their position within the array of compare values.

In the example of FIG. 1, two different medians or values of designated rank are identified and selected each from its own set of twenty-five elements and each is used to filter the respective red and blue pixel values of the target pixel in the array. As a preferred option, filtering is not applied to pixels at the boundary of an image where a full set of pixel based values is not available to populate the array from which a median or value of specified rank is selected. Filtering is preferably performed on successive pixels in the array so that pixel related values introduced into the neighborhood over which the median or value of designated rank is chosen are used along with related comparison results for filtering of several successive pixels. One of the features of the invention is that compares are preferably organized so that only the pixel elements in the subset that are newly introduced to the array are compared against other elements in the array. This criterion may be replaced by one stating that at least a portion of compare results are obtained once and used in finding the median or value of specified rank for more than one pixel in the array.

An additional feature is that elements of equal value are ranked in a prescribed, logically consistent order so that even elements of equal value are sorted in a prescribed sequence so that each element in the ranking that is established has a rank that is unique in the set. This has the major benefit that a middle element or other element of a desired rank is always present and uniquely specified. This is true even when more than one of a set of equal element values might have been chosen as the median. In this case, selection of any member of the set of equal values that include the median element provide the same result. A second benefit is that for a comparison of A to B if element A is less than element B, then element B is greater or equal to element A so the compare value of B compared to A is the logical complement of the compare value of A compared to B and for the order dependent ranking this is the preferred result to assign to a comparison of B to A. Thus, one comparison of A relative to B may be performed without any separate compares to determine equality and one compare operation provides the necessary information to provide the value of the compare in the reversed order by simply taking the logical complement of the compare performed in the non-reversed order. These are subtle points but ones on which both the success and the efficiency of the ranking calculations depend. If "1" is used to denote that an element is considered greater than another element of the set and "0" is used to denote that the element is not considered to be greater, then the ranking of an element is preferably denoted as a numerical value ranging from 0 for the lowest rank to N−1 for the highest rank with N elements in the set. This rank for a given element is equal to the sum of the set of compare values for the element as it is compared to each of the remaining N−1 elements in the set.

The median filter is preferably used to modify or filter color components of the pixel in the middle of a rectangular or square array (the device of this invention is not limited to these configurations) of pixels with pixels in the array serving as the base for the median or ranking calculation that is preferably used to modify one or more color components of the pixel that is in the middle of the array. In a preferred configuration, the filtering operation is applied successively to pixels in a row using the median of a five by five array of pixel related values. As one advances from applying the filtering operation to one pixel to application to the next pixel, a new column of five pixel related values are calculated and introduced into the array 107 from which the median is chosen and the oldest column of pixel related values is discarded from the array. In the example of FIG. 1, values in column 0 of array 107 are overwritten by corresponding values shifted from column 1, as values from column 2 are shifted to column 1, values from column 3 are shifted to column 2, values from column 4 are shifted to column 3, and newly calculated values from which the median is selected are shifted into column 4, all in row-wise shift register fashion. In this arrangement, each column of pixels serves as part of the array 107 from which the median is selected for five successive applications of the median filter to five successive pixel values.

As illustrated in FIG. 1, the compares are arranged to reuse both compare results and/or partial sums of the compare results (or compare related values) as they apply to the set of compare values for each member of the array with other members of the array. The final ranking for each given element of the array is preferably calculated as the sum of the number of true compare results for an ordered comparison of the given element to each of the other elements of the array. In a separate optional improvement, an additive constant is used to reduce the color content of pixels with a low numerical value in order to reduce color noise in dark areas of the image that are most subject to color noise artifacts. Where logarithms are used, the addition of a positive nonzero integer value to non-negative pixel values also serves to prevent attempting to take the logarithm of zero. With the preferred log based calculation, the values calculated for the median selection are directly related to the logarithm of the ratio of the pixel's red color component value to the pixel's green color component value for the red filtering operation and to the logarithm of the ratio of the pixel's blue color component value to the pixel's green color component value for the blue filtering operation. With high dynamic range images, some of the ratios may be very large or very small. In reality, the combination of electrical crosstalk, or optical crosstalk, and of limited rejection of non-red light by the red pixel filters, non-green light by the green pixel filters, and non-blue light by the blue pixel filters place a practical limit on the ratio of color component values that an imager will render even for large uniform color blocks of a primary color. There may be little benefit in allowing the ratios of the red or blue pixel component values to their green pixel component value to exceed this device limit by very much. Such a limit will also limit the pixel bit width of numbers needed to convey the color information. In the logarithmic based color representation the limit on the ratio of filtered color to green or green to filtered color component may be clamped by simply clamping the resulting logarithmic value to stay within prescribed positive and negative bounds. For example, when using log to the base 2, clamping the result to an upper bound of 5 and a lower bound of −5 limits the ratio of the color component to green to a range of 1/32 to 32.

In FIG. 1, array 107 indicates 5 rows each with 5 shift register linked storage locations arranged to store the array of 25 multi-bit values from which the pixel related value of the specified rank, preferably the median, is chosen. A new column of pixel related values is calculated and input to column 4 (S04, S14, S24, S34, S44) of array 107 while shifting each of the rows in a row-wise, left shift operation so that the oldest elements in column 0 (S00, S10, S20, S30, S40) are overwritten. Filtering operations are preferably excluded for boarder cases where the matrix of values Sij from which median elements are selected is not fully populated. Color components of the pixel related to S22 are preferably the ones to which the median calculations are applied. The triangular shaped compare value array in value ranking computation circuit 100 and the supporting array 107 from which the median or ranked value is selected and calculation and selection circuit 136 are preferably provided in duplicate so that median filtering may be provided for a first color component, preferably red, as indicated in 108, and for a second color component, preferably blue, as indicated in 109. A number of variants of the median based filter may be used including the one described in the Maschal et al reference. However, especially for high dynamic range images, a ratio-metric function of pixel component values is preferable to a difference based value. In field programmable logic circuits, it is often more efficient to compute logarithmic and anti-logarithmic values than to perform direct division. Furthermore, with signed values, high dynamic range liner pixel values may exceed 24 bits and may be more compactly represented as a ratio in logarithmic form thereby reducing the size of the computational circuit 100 making it preferable to use the log form. log 2 is used in FIG. 1 to indicate preferable use of log to the base 2. The invention is not restricted to use of red, green, and blue color components or even to green as the reference color component. However, the reference color, is preferably the one most directly related to pixel luminance since being unfiltered in the median filter operation above, this will help to preserve visible edges. Secondly, it is preferable to use the color component having the smallest interpolation artifacts as the reference color which is again green when using a RGGB Bayer color filter array with twice as many green filtered pixels as red filtered or blue filtered pixels in the array. Prior to calculation of the median values it is preferable to perform interpolation to provide a full set of red, green, and blue pixel color components Rij, Gij, and Bij for each pixel location in the pixel array. For the red pixel median filter Sij components are calculated preferably using red and green pixel values as indicated in 108 for the red pixel median filtering circuit and for the blue pixel median filter Sij components are calculated preferably using blue and green pixel values as indicated in 109 for the blue pixel median filtering circuit. RMF22 indicates the median filtered red component to replace the red component of the pixel corresponding to S22 in the red median filter calculation, and BMF22 indicates the median filtered blue component to replace the blue component of the pixel corresponding to S22 in the blue median filter calculation. Note that values calculated for Sij are different for RMF22 than for BMF22.

The circuit 100 preferably operates on pixel based calculated values from the array 107 and there are preferably essentially duplicate instantiations of the circuit, one to handle median or other ranking calculation for one color component as indicated in block 108, and the other to handle similar calculations for another color component as indicated in block 109. A usual way to calculate a median value or a value of specified rank from a set of values is to sort or partially sort either the values or pointers to the values and then to select the median or the value of specified rank from the list. Note here that the device in the invention may be applied, still within the scope of the invention, to obtain the median for an even number of elements in which case there is no single middle element, and the median may be calculated as the average of the value that ranks just below the middle and the value that ranks just above the middle. In the preferred configuration, a matrix of compare values or of partial sums of compare values are assembled based on comparisons of new elements entered in the array 107 with elements already in the array 107 and partial sums of compare results characterized in that they are partitioned into subgroups such that at least a portion of the subgroups of partial sums remain valid for more than one of the median calculations as portions of the elements over which the median or specified ranking is performed are replaced by new values while a portion are retained in successive median or ranking calculations.

In a specific example depicted in FIG. 1, an array of pixel related values 107 for which a median and/or other ranking is calculated is depicted if FIG. 1. The values are organized in five rows and five columns and the median or ranking calculation is preferably performed after entering a new set of values at column 4 and shifting previous columns of values left one column position so that the previous set of values in column 0 is lost. Values previously in columns 1 through 4 remain but now with each in the next lower column position so they occupy columns 0 through 3. Calculation block 100 provides comparison indications preferably in the form of binary I/O values. Selection circuit 110 selects one of the five elements from column 4 as indicated by inputs 111 and presents the five column values in a sequence to be compared with other elements in the array.

$S_{04}$ is compared with all 24 elements in the array and $S_{14}$, $S_{24}$, $S_{34}$, and $S_{44}$ are then successively selected by selection circuit 110 for compare and are compared, respectively, with 23, 22, 21, and 20 other elements in the array. The array is triangular because, as indicated above, the compares are preferably structured to logically support a specified ordering so that equals will still be assigned a discrete ranking depending on their position in the array of compare values and/or their order of entry into the array and support for the ordering is provided by using the logical complement of the compare indication when the order of comparison is reversed. For example, each of the 24 compare circuits with compare circuit 122 shown on the right may be configured to indicate that the element selected for comparison, 132, is greater than the element against which it is compared by output of a compare value of 1 for the greater than compare condition and an output of a compare value of 0 otherwise when the element selected for comparison is less than or equal to the indicated element against which it is compared. Then the value of the compare for a reversal in the order of the comparison is the logical complement of the compare value indicated by the circuit. Since compare values specified in the reverse order are the logical complement of compare results obtained in the original order, the triangular matrix contains all of the necessary compare results to obtain indications the result of the compare of any value in the array to any other value in the array. The compare indications calculated in this sequence of compare operations provide all of the compare values needed to rank the elements of array 107.

Values of all elements of the array except $S_{04}$ are inputs to individual compare circuits that are grouped by their column position in array 107 and input to the comparators at 112, 113, 114, 115, and 116. For each of the subgroups for a particular column, inputs are grouped by row position in 107. The row and column designation from array 107 of individual input compare values against which the selected compare value 132 is compared are also used as column designations for the matrix. The row designations of $S_{04}$ through $S_{40}$ are also grouped by their column designation in array 107 in the same order as in array 100 going from top to bottom as the column designations in going from right to left so the row column locations representing the self compares of elements against themselves occur at the right ends of the rows of the triangular matrix. Element $S_{40}$ is included after $S_{30}$ because the sum of complemented compare indications in column $S_{40}$ indicate the rank of element $S_{40}$ as will become clear from the ensuing description. The rows representing compare results for elements from columns 4 through 0 of the array 107 are grouped as indicated by brackets 117, 118, 119, 120, and 121. The row and column designations indicate respectively the value being compared for the row and the value against which it is compared for the column. The larger black dots like 125 indicate compare values that are computed and open dots like 127 represent the matrix location of the self compare of an element to itself. With the indicated greater than compare criteria, these would be 0 and are only place holders whose values do not need to be used. They are used as row to column transition placeholders as will be indicated in the description below.

The complete list of compare indications for any element includes all of the compare indications in the row for the designated element up to the self compare indication that is preferably not included and continue with the logical complements of compare indications from rows above this row that are in the column with the same element designation. The self compare indication is at the intersection of this row/column pair that is associated with a particular element. It is preferable to partition compare results into groups that are related to sets of pixel related values that are entered and/or moved within the array between calculations of a median or ranking value for successive pixels represented by the array of calculated values.

In the array 100, there are five triangular sub arrays of elements 102, 103, 104, 105, and 106, each representing compares of elements with other elements in the same column and including the place holder for a self compare that is preferably not performed. The five "L" shaped boxes similar to 129 in sub array 102 contain the compare indications associated with a particular element of the array 107. The middle "L" shaped box at 129 contains the compare indications in the horizontal portion of row $S_{24}$ for which $S_{24}$ is compared with other elements in the column, the self compare place holder, and elements from column $S_{24}$ for which other elements from other rows are compared against $S_{24}$. The summation of four compare related values enumerating the comparisons of $S_{24}$ with other elements in the same column is obtained by summing logically true occurrences of the compare indications in the row portion of the group with the sum of logically true occurrences of the logical compliments of the compare indications in the column portion of comparison where the original compare is for that of other elements in the column against $S_{24}$. In a preferred implementation, the sum of logically true indications made up of the sum of compare indications for the row portion and sums of the logical complements of compare indications in the column portion of the compare indication matrix is registered in three bit memory 128. Similar sums following similar rules are made and registered in corresponding memory elements for comparisons the remaining four elements $S_{04}$, $S_{14}$, $S_{34}$, and $S_{44}$ with other elements of the same column. It should be understood that the geometry of the layout in FIG. 1 is merely for convenience in description as are particular numbering designations and the invention is not limited by either. As will be indicated hereinafter, the rank of each element is preferably taken as a count or sum of the number of other elements in the array 100 that are exceeded by the element specified in the row and column pair according to the chosen compare criteria. Here the compare criteria may include comparison ordering and/or position in the array of compare values and the compare criteria or rule is preferably used to establish a discrete order even when there are one or more subgroups of elements of equal value in the array 107. The logical complementing described herein is used to transform from a compare result for a comparison performed in the reverse order to a compare result for a comparison performed in the desired order. As the array 100 is shown and for the ordering preference used, compare indications in rows are in the proper order and are not complemented in the partial compare result tallies and compare indications in columns are in the reverse order and are logically complemented in the partial compare result tallies. Sums of designated subgroups of the partial compare result tallies that are indicated are sufficient to calculate the rank of each element so individual compare indications need to be registered only until they are entered into necessary horizontal and vertical sums and do not need to be registered at all if incorporation in the sums does not require registering of the value. For the greater than criterion used in the example for the direct compare operation for new elements as they are entered, older elements with row designations that are further toward the bottom in the list of row designations in the triangular array of calculation unit 100 are given higher ranking than equal elements that are higher in the list of row designations.

There are ten sub arrays of 25 elements four related to Col 4, three to Col 3, two to Col 2, one to Col 1 and none to Col 0. The sum of logically true indications for the compare of element $S_{24}$ with the five elements of Col 3 is registered in 3 bit register 123 and the row of the five compare indications used for the sum is contained in the outlined horizontally positioned box 124. The sum of logically true indications of the logical complements of compares of the five elements in Col 3 against element $S_{24}$ is registered in 3 bit register 131 and the column of five compare indications is contained in the outlined vertically positioned box 130. The four remaining vertical sums and the four remaining horizontal sums for 101 are calculated and registered in the same manner as are partial sums of compare indications for the remaining three sub arrays of elements for the five rows of compare indications related to elements in Col 4 (117). Select circuit 110 is used in the preferred embodiment to cycle through the five elements of Col 4 of array 107 to obtain the 110 compare indications and their logical complements for compares in the reverse order. Note that each compare value is used twice, once for a comparison in the order used in the comparison and once in complemented form for a comparison in reverse order. As will be explained below, the compare indications or preferably the sums of compare indications provide the data for the 190 additional comparisons associated with columns 3, 2, 1, and 0 of array 107.

With the organization of compare results indicated in FIG. 1, when the calculation of median values are completed for a pixel in the row, if there are additional pixels in the row, all columns of elements in array 107 are shifted left overwriting values for Col 0 and entering new values for Col 4. Inspection of the triangular array 100 with associated column designations for element designations for both the columns (116, 115, 114, 113, and 112) and rows (117, 118, 119, 120, and 121) of the array 100 reveals that the column shift of columns in 107 correspond to diagonal group shifts one column position down and one column position to the left in the array 100. This indicates that compare values or preferably the partial horizontal and vertical sums of compare indications remain valid when shifted down and to the left by one column position and by one row position dropping values that would be shifted out of the array 100 and calculating compare results and partial compare result sums for only the first five rows of the array 100 that are vacated by the diagonal shift operation. Stated in a more general context, the positional designations of compare values from previous operations that correspond to elements that are retained for a new ranking operation are changed to reflect the new position of the elements on which the compare values are based in the array 107.

Block 136 lists the final operations to calculate a rank for each element of the array 107, to indicate the element/elements of the specified rank/ranks, and to select it/them as needed for specified operations. From array 100, the rank for each element listed in the row and column headings is the sum all of the partial sum terms that appear either in the row or the column for the specified term. In the example, there are five partial sum terms for each element. The circuit is preferably configured to compute the sum for each of the twenty five elements and to test the value of each sum for equality with the designated value or values to flag the one or ones having the designated value or values. The preferred circuit is configured so that every indication of rank is discrete, that is, every value from 0 to 24 occurs exactly once as an indication of the rank for each calculation of the set of rank values. In the preferred implementation a select circuit is preferably provided to select the median value having rank 12 and supply it as the value to use for median (Sij) in the equation for RMF22 for calculation of the red element filtered value in block 108 or for BMF22 for calculation of the blue element filtered value in block 109.

Several options that may not be directly linked to the median or rank selection based filter above are described in what follows.

The median based filter described above is effective in removing color from isolated pixels but the luminance of the pixel is set primarily by the value of the green pixel that is not changed in the median filtering of the red and blue pixel components. With distracting color artifacts removed, very bright, isolated pixels from specular reflections of sunlight are still somewhat distracting. As an option, after using green pixel component values to calculate the median and preferably with green color components in the logarithmic form, it is beneficial to filter the green components by locating the isolated bright green pixel color components and reducing their brightness preferably using the original green component for the calculation of Sij in the equations in blocks 108 and 109 of FIG. 1 and then using the value of reduced magnitude for G22 in calculation of RMF22 in 108 and BMF22 in 109. In this way, color is effectively scaled while reducing brightness of the isolated spots. As an optional but beneficial addition to median filtering of the red and green color components of pixel values, green color components may be scanned to locate localized peaks and the value of these peaks may be clamped or otherwise limited in brightness level relative to neighboring pixels to subdue distracting bright peaks. Since the most distracting bright spots come from specular reflection of direct sunlight on a clear day and with the sun as a reference, such spots are very bright. Thus, as an option, reductions in pixel brightness may be limited to pixels whose level exceeds a threshold value or other brightness criteria.

In one implementation, preferably with green pixel components in logarithmic form, G22 is first sampled for use to calculate the separate values of Sij for the filtering of the red pixel color component for the pixel corresponding to location S22 in block 108 of FIG. 1 and for the filtering of the blue pixel color component for the pixel corresponding to location S22 in block 109 of FIG. 1. Then the max value of the four or optionally eight nearest neighbors of G22 may be calculated and the value of log 2(G22) may be clamped to this value plus a constant z (as an example, z might be set to 2) and used to replace the green component of the pixel corresponding to S22 and also to calculate RMF22 and BMF22 so that the filter red and blue color components 108 and 109 of FIG. 1 are adjusted to generally preserve the color ratios of red to green and blue to green when the value of G22 is adjusted. In the antilog form this will clamp the value of the green pixel G22 to be no more than 2z times greater than the maximum value of the green pixels included in the set of neighboring pixels from which the maximum pixel value is selected. With z equal to 2, this would be a limit of 4 times greater. Additionally, for the implementation just described, the relative values of the red, green, and blue color components are preserved with the limiting of the green pixel component so that the effect on its color is minimal.

In a second implementation, to reduce the effects of pixel reading noise in low light level during the interpolation stage to supply missing color components, for pixel locations where the reading value is low (below 32 for example) the interpolation system reverts to an interpolation mode that provides interpolated values that contain lower and/or less noticeable noise levels. In one implementation, for pixels whose readings are below 32, bilinear interpolation is substituted for a more complex interpolation algorithm that may include edge detection and/or inclusion of pixel values for color components that are different from the one being interpolated. The reasons are that edge detect algorithms may interpret noise as edge patterns and create edge like interpolation artifacts and the coefficients of pixel values that are not of the color being interpolated are frequently based on estimates of first or second spacial derivatives of color components and these digitally sampled derivative values amplify noise. The bilinear interpolation based on averages of nearest pixel values using pixels having filters with the color being interpolated use smoothing averaging effects and do not add to noise levels through use of color components of colors that differ from the one being interpolated and do not use edge detection each of which add noise as indicated above.

In prior art, some outside mirrors are tilted downward when the vehicle is placed in reverse gear and the images from some cameras specifically applied for use when the vehicle is in reverse are known to provide adaptive fields of view that are dependent on vehicle speed and direction of travel. In a new device, a camera and display are provided to replace an inside, rearview mirror and like the mirror that they replace, they have a relatively large width to height aspect ratio. When the vehicle is placed in reverse gear the mirror is configured to digitally select an image that is included in the camera's field of view but that is different from the one used for normal forward travel of the vehicle. This image includes a view of the ground or roadway that is closer to the vehicle to assist the driver in backing. The selection may optionally be varied over time or using factors such as vehicle speed or input from proximity detectors that might pan or switch to a field of view likely to include a view of the detected object.

One of the most objectionable consequences of saturating parts of an image is that color is normally lost or severely distorted. With imagers having very high dynamic range there are often very bright areas possibly including direct view of the sun or direct view of other lights such as headlights, signal lights, stop lights, emergency flashers, or streetlights that are usually far brighter than the rest of the scene. For use in vehicles, it is particularly problematic to turn a color to white for full saturation or to some errant color for partial saturation when the original color identified light from a stop light, turn signal, emergency flasher, taillight, or other light that is normally identified at least in part by its color. Unlike normal cameras that do not normally capture color information in saturated portions of a scene, imagers having a very high dynamic range capture color information much of the time for many of the lights referred to above. In a preferred version of the present device, rather than clipping individual color components that exceed the output pixel value range, it is preferable to limit values in a way that applies the adjustment to all of the color components of a pixel having a color component that exceeds the output range preserving the color of the pixel. Then operations such as tone mapping used to map the dynamic range of the captured image to the dynamic range of the output space may be used with somewhat lower compression settings without losing color information from lights that are frequently far brighter than anything else in the scene.

In a preferred implementation of color preserving pixel value limiting, pixel color components are preferably encoded in logarithmic form preferably with the antilogs of these values being in a linear or perceptually linear color space. A linear form of RGB is preferred with red, green and blue color components all having values ranging from zero (or one) to the same maximum color component value for the pixel. For each pixel the maximum value, in logarithmic form, of the color components for the pixel is preferably chosen and compared with the logarithm of the maximum color component value for the output pixels. If the maximum is exceeded, the difference between the logarithm of the maximum pixel component and the logarithm of the maximum output pixel value is subtracted from each of the logarithmically encoded pixel color components. At some point, preferably as part of a lookup table based conversion to the color space of the output pixel value, the logarithmically encoded values are preferably converted to anti-logarithmic form or to another desired form. In the implementation just indicated, each pixel having a value leading to saturation has its color components scaled by a common ratio so the maximum color component falls just short of saturation. In a modified version of the hard limiting applied above, the brightest portion of the output value range may be reserved for pixel values to which limits are applied and a soft limiting may be applied to scale the brightness of the pixels to which limiting is applied so that those that just exceed the lower limiting threshold are mapped to the lower part of the range reserved for limiting and very bright pixel values that greatly exceed the limiting value are mapped to the upper part of the range.

Another issue is that at night, with dark surroundings, the imager exhibits its greatest noise and this noise is most noticeable in the dark surroundings making it highly objectionable. It has been found to be beneficial to subtract a preferably constant value from pixel readings, preferably prior to color interpolation to hide the worst of the noise in the black level so the display will go to its blackest level when image illumination is too low to render a good image. The subtraction is preferably performed so that the pixel value is not allowed to go below zero and with issues in taking the log of zero or division by zero, it is often preferable to set the lowest value assigned to a pixel after the subtraction to one. The additive constant k used in blocks 108 and 109 of FIG. 1 may be increased to compensate in part for the effects on color at low light levels due to lowering of values of individual color components in raising the black point slightly above the level at which noise predominates.

As described in prior art such as Application note KAC-9648 Rev 2 published by Kodak in November 2004, the characteristics of filter and imager response to color do not completely match human vision so imagers, like almost all other devices that handle color images, normally benefit from color correction. This was accomplished by converting colors using a three by three matrix multiplication as outlined in the application note. Improvement in color was significant with further improvement achieved by adjusting matrix coefficients to calibrate them to the specific imaging device.

Figure 3:
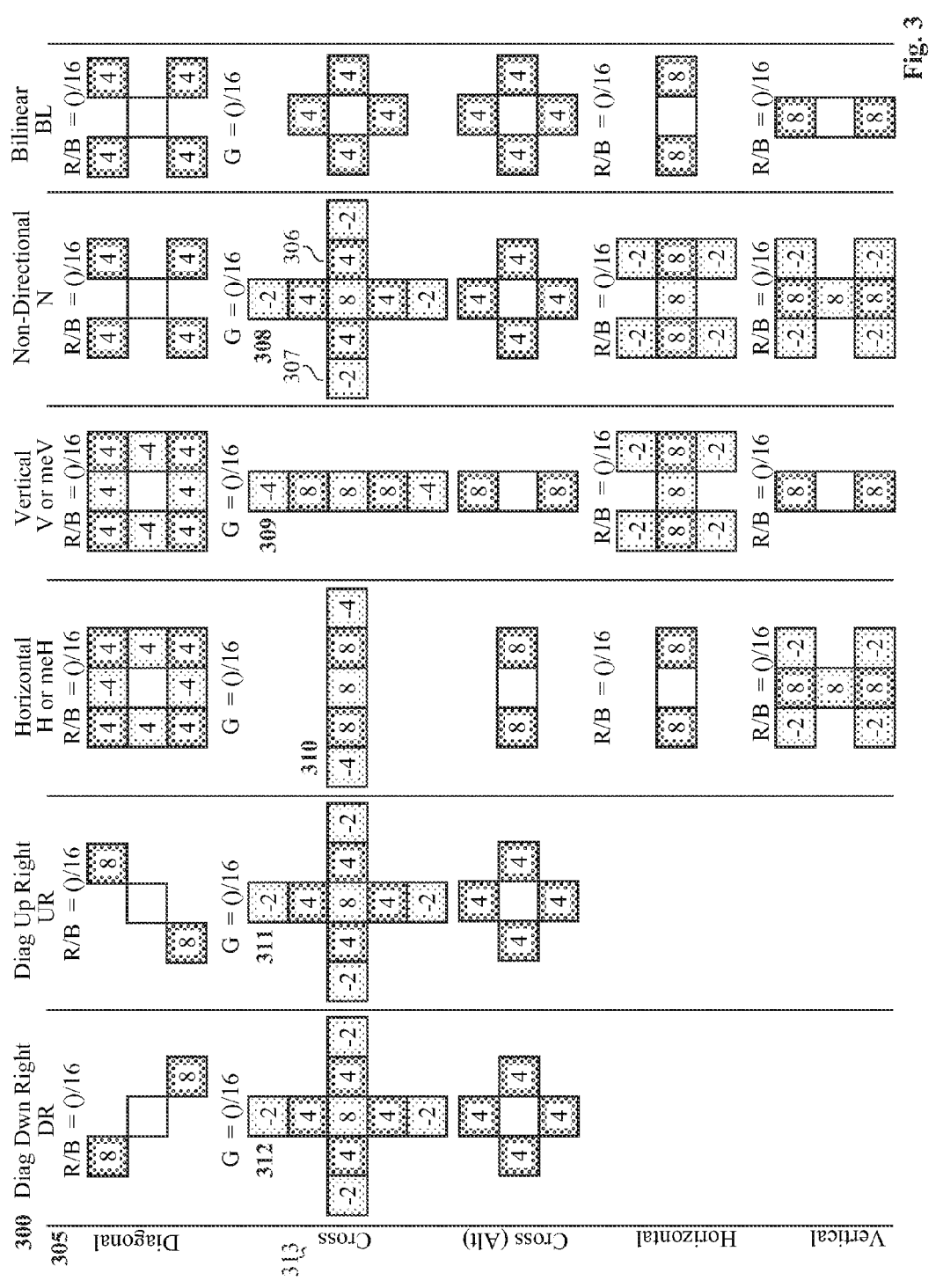

In FIGS. 2 and 3, a beneficial option to use second derivative terms calculated from red or blue pixel values to improve interpolation of green pixel values is detailed. The option includes a test of the magnitudes of red or blue pixel values that are candidates for use in the derivative term for the calculation relative to green pixel values selected for use in the calculation of the interpolated green pixel value. When the magnitude of one or more of the red or blue pixel values that are candidates for use in the calculation of the green pixel values are unexpectedly large based on a screening criteria wherein the red or blue candidate values are compared to the relative magnitudes of green pixel values selected for use in the interpolation, the second derivative terms are omitted from the calculation. Otherwise the second derivative term is included. The inclusion of the derivative term improves the sharpness and resolution of the image but without the screening criteria their inclusion contributed to substantial increases in the number of pixels that stood out visually as serious interpolation errors in very high contrast regions of the high dynamic range image. With the inclusion of the screening criteria, most of the benefit is realized without the large increase in serious interpolation errors. The screening criteria is preferably based on a comparison of the relative magnitudes of pixel values, preferably of pixel values that are candidates for use in calculation of the interpolated value rather than on comparison with predetermined thresholds. Nonzero pixel values in the same frame may range over more than a million to one in some scenes and a high dynamic range camera for which these calculations were used provided nonzero pixel values that ranged over more than 10 million to one in the same high dynamic range image so that predetermined thresholds applicable to one portion of the scene for purposes of this screening would not be appropriate for other very high contrast areas recorded at much different illumination levels in the same scene.

Referring to FIG. 2, where interpolation patterns and screening criteria for conditional inclusion of selected non-green pixel values in the calculation are detailed. With a conventional RGGB Bayer color filter pattern, a pixel C22 for which an interpolated green pixel value is calculated will have either a red or a blue color filter and pixels C02, C20, C24, and C42 all have filters of the same color as C22. The pixels C02, C20, C24, and C42 are each two pixel positions away from interpolation position C22 and may have values that differ radically from that of C22 in high contrast portions of the image and such radical differences (ratios) often lead to interpolation errors that stand out when these values are used in an interpolation equation. On the other hand, in most other parts of the image, the inclusion of these values in the interpolation equation leads to more accurate interpolation results that provide significant improvement in both perceived and real resolution of the interpolated image. In FIG. 2, a prior art edge detection algorithm is used to classify the interpolation as non-directional or as a diagonal edge in which cases the pattern 200 is used and patterns 201 and 202 are used, respectively, when vertical or horizontal edge patterns are detected. The cross interpolation is used when the red or blue filtered "Cxx" pixels meet the screening criteria and the cross (alt) patterns from which the color pixel second derivative based terms are omitted are used when the "Cxx" pixel values do not meet the screening criteria. The screening criteria used in the example are based on comparisons of the relative magnitudes of green and non-green pixels that are candidates for inclusion in the interpolation equation. In the equations K represents a multiplying value and, as an example, 2 has served well as the value for K in trials of the screening criteria. 2 is convenient since the pixel values may be multiplied by 2 by simply shifting them one bit position to the left. The criterion used is to include the color term when none of the non-green filtered pixels other than the one at the interpolation site that are candidates for use in the interpretation calculation are more than K times larger than the closest green pixel that is used in the interpolation equation. The conditional statements and equations for the three pattern specific versions of the interpolation equations at 200, 201, and 202 detail the operations.

Figure 4:
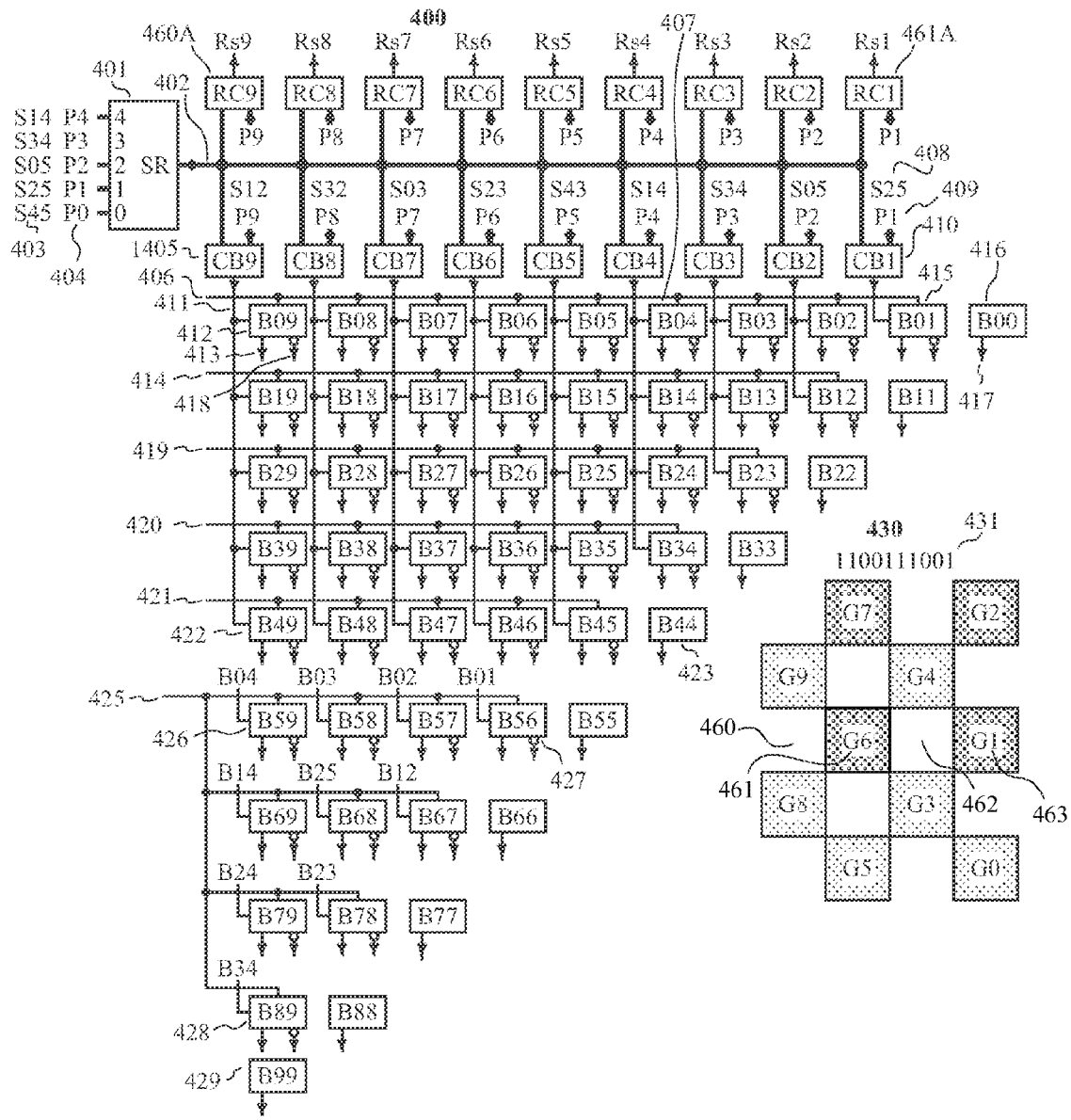
FIG. 4 is a diagram illustrating a pattern of ten green pixels, in accordance with one embodiment of the present invention.

Much of the detail in FIGS. 3, 4, and 5 is described in prior applications referenced above, and will not be repeated here. FIG. 3 is different than the prior art for several reasons, including, but not limited to, first, the cross interpolation equations used to calculate interpolated green pixel values have been replaced by the conditionally selected cross and cross (Alt) interpolations described in detail in the description of FIG. 2. Second, four categories of cluster patterns are not included but may be used as an option. Third, coefficients of green filtered pixel values used in a number of the interpolation calculations for red and blue interpolated values have been scaled to lessen their effect after it was discovered that this generally reduced the intensity of the Moiré patterns in the interpolated images. Fourth, an additional Bilinear (BL) interpolation category is added.

In FIG. 5, lines 501 through 505 illustrate the Bilinear (BL) classification in item 501. The horizontal edge H and vertical edge V indications at 516 and 517 have been modified to specifically exclude cases where BL is asserted and bilinear interpolation is used or where the multiple close spaced edge indications ME or CME are asserted in which case the horizontal or vertical indications may be asserted through further processing detailed in prior filing referenced herein, and in this implementation are selected as indicated in the prior filing but are separately labeled as Used for the entire image, bilinear interpolation has many drawbacks. However, it has an averaging effect that tends to reduce the effects of noise and its interpolation algorithms contains no derivative terms that amplify noise.

Furthermore, edge detection algorithms may classify some of the noise patterns as edges or may detect and thereby accentuate actual edges in imager artifacts. Artifacts introduced by switching integration ranges become most noticeable in very low contrast areas of the image such as in views of clear blue sky. Additionally, with an imager for which these algorithms are used, there is an indication that the exposure of a pixel is not within its expected range. The out of range indication is most often asserted because the light level projected onto a pixel changes during image acquisition due to being the image of a flashing or duty cycled light or due to being the image of a moving high contrast edge in a scene.

In all of the situations noted above, the bilinear interpolation tends to soften the interpolation and image acquisition artifacts. The very low and very high pixel values are detected by direct comparison of the pixel value with K2 and with K3 and the unexpected range indication is communicated from the camera as part of the pixel data. Optionally, this information may be obtained by analysis of the raw pixel data to determine if the pixel reading is in or out of the expected range for a particular integration period. Features to provide this information in pixel data are provided by only a few devices such as the one described in references referred to herein. Detection of low contrast regions in the image is the most difficult and there is synergy in using compare indications used in the preferred pattern based edge detection algorithm whose operation is outlined in FIGS. 4 and 5 and applied in part in the median filter depicted in FIG. 1. The median filter in FIG. 1 utilizes the triangular matrix of compare related values to rank the elements in order to enable and facilitate selection of an element of specified rank. This same mechanism may be added here to utilize the existing array of compare indications for the green pixels in the pattern array to identify the indices i(min) and i(max) of the respective minimum and the maximum green pixel values in the array of green pixel values. To add this capability, the compare indications corresponding to KEY i as indicated in 507 are checked according to the expression 504 to find the value of i=i(min) for which all of the compare indications Bij for which j is not equal to i are zero indicating that Pi is less than (or possibly equal to) Pj. This check is repeated either sequentially and/or in parallel for KEY i for each value of i to find the index i(min) of the pixel with the minimum value in the array (or at least a minimum when more than one member has the minimum value) and a selection circuit is provided to use i(min) to select the minimum pixel value Pi(min). Likewise, the compare indications corresponding to KEY i as indicated in 507 are checked according to the expression 505 to find the value of i=i(max) for which all of the compare indications Bij for which j is not equal to i are one indicating that Pi is greater than (or possibly equal to) Pj. This check is repeated either sequentially and/or in parallel for KEY i for each value of i to find the index i(max) of the pixel with the maximum value in the array (or at least a maximum when more than one member has the maximum value) and a selection circuit is provided to use i(max) to select the maximum pixel value Pi(max). Since the compare indications are only one bit each, this logic even when implemented in parallel requires far fewer resources when using the shared array of pixel compare indications as indicated in FIG. 4 than providing an independent implementation. In the expression for BL of the example, low contrast is indicated by what is effectively a ratio metric comparison where the minimum of the representative pixel values is greater than a constant K1 times the maximum of the representative pixel values. K1 should be less than one and in experiments, 0.75 performed well as the value for K1 in experiments. This expression may be rearranged to indicate that the contrast is low when the ratio of the minimum pixel value to the maximum pixel value in the set of pixel representative of the local contrast level is greater than K1 where K1 is less than one. This is logically equivalent to the form expressed for BL in 501 and more intuitive but harder to implement.

Equation 502 indicates the value of the compare indication that indicated that Pi is greater than Pj. This information needs to be known to select the minimum and maximum values. With the pattern arrays, pattern images that were negatives of other pattern images were often treated as equivalents so knowledge of the sense of the compare was not always needed. This is not intended to imply that a 1 or 0 must be assigned to a particular compare condition but that the value assigned to a particular compare condition needs to be known and appropriately used in finding pixels with the maximum and minimum numerical values.

The equation for BL 519 asserts BL for the low contrast or the very low pixel value or the very high pixel value or the unexpected range indication for the pixel value to select the interpolation pattern, preferably bilinear, that produces generally less objectionable interpolation artifacts in these situations.

In the above, the usual Bayer pattern having two green filtered pixels for each red filtered and each blue filtered pixel is assumed for convenience in description. Further, the bilinear interpolation is used as the interpolation method to produce fewer artifacts under the conditions detected by expression 501 for BL. The invention is not intended to be limited by these choices. Color filter arrays with other patterns may be selected. For example, if a filter pattern similar to the Bayer pattern but with two red filtered pixels to each green and each blue filtered pixel is used, the references to green may be replaced by references to red and the references to red may be replaced by references to green in most of the foregoing description. Stated conditions may be omitted or others added in the expression for BL and/or other interpolation patterns that generally reduce interpolation artifacts for pixels for which BL is asserted may be used. Note that the BL classification preferably applies to selection of the interpolation pattern for two adjacent pixel locations one with a green and the other with a non-green filtered pixel.

In conditional selection of the green interpolation pattern, the derivative term is referenced. This is correct for the preferred interpolation pattern. However not all interpolation patterns use derivative based terms to enhance the quality of the interpolation and the use of candidate pixels to include in the interpolation for conditional use of non-derivate terms for enhancement of the interpolation are also considered to be part of this invention. Additionally, as an alternative to comparison of red or blue candidate pixels to green pixels, they may be compared to the central like colored red or blue pixel or minimum and maximum pixel values in the candidate group may be compared as alternate screening criteria as a part of this invention.

As with most digitally processed images, a sharpening operation to increase perceived resolution is beneficial. A preferred embodiment is based on a prior art unsharp mask enhanced by use of an image edge and image feature classification based mask generated primarily with data already provided by the multi-pattern interpolation calculation circuit. The mask is used to restrict application of sharpening primarily to significant edges and preferably to further restrict sharpening to exclude areas of the scene known to frequently contain noise or other artifacts that should not be made more prominent by sharpening. The mask is buffered for synchronization between the interpolation and sharpening operations and is used to selectively restrict application of the unsharp mask to areas where edges are detected preferably using detection circuits and data also used in the interpolation operation. As an optional but preferred enhancement, sharpening is further restricted to exclude areas of the image where sharpening is likely to increase noise or increase the prominence of other artifacts. Such areas may include low contrast areas, rapidly moving high contrast edges, areas that image flashing or duty cycled lights, areas with low pixel illumination, and/or areas with extremely bright pixel illumination. The multi-pattern edge detection described in this specification in relation to FIGS. 3, 4, and 5 already provides indications of the image features just described. In the preferred implementation BL (501 in FIG. 5) is asserted for low contrast, low pixel values, unexpected pixel values for a chosen pixel integration period that are often due to moving high contrast edges or to flashing or duty cycled light sources. Horizontal H designation 516 and vertical V designation 517 in FIG. 5 explicitly exclude pixels having the BL designation 501 or the multiple close spaced line designations ME 514 or CME 515. These latter two patterns indicate areas where close spaced edge features make it difficult to distinguish between horizontal or vertical edges and are prone to Moiré pattern artifacts that become more prominent when sharpened. Thus, it is preferable to include pixel locations where ME or CME are asserted in the classification of pixels for which the sharpening strength is reduced or sharpening is inhibited.

Figure 6:
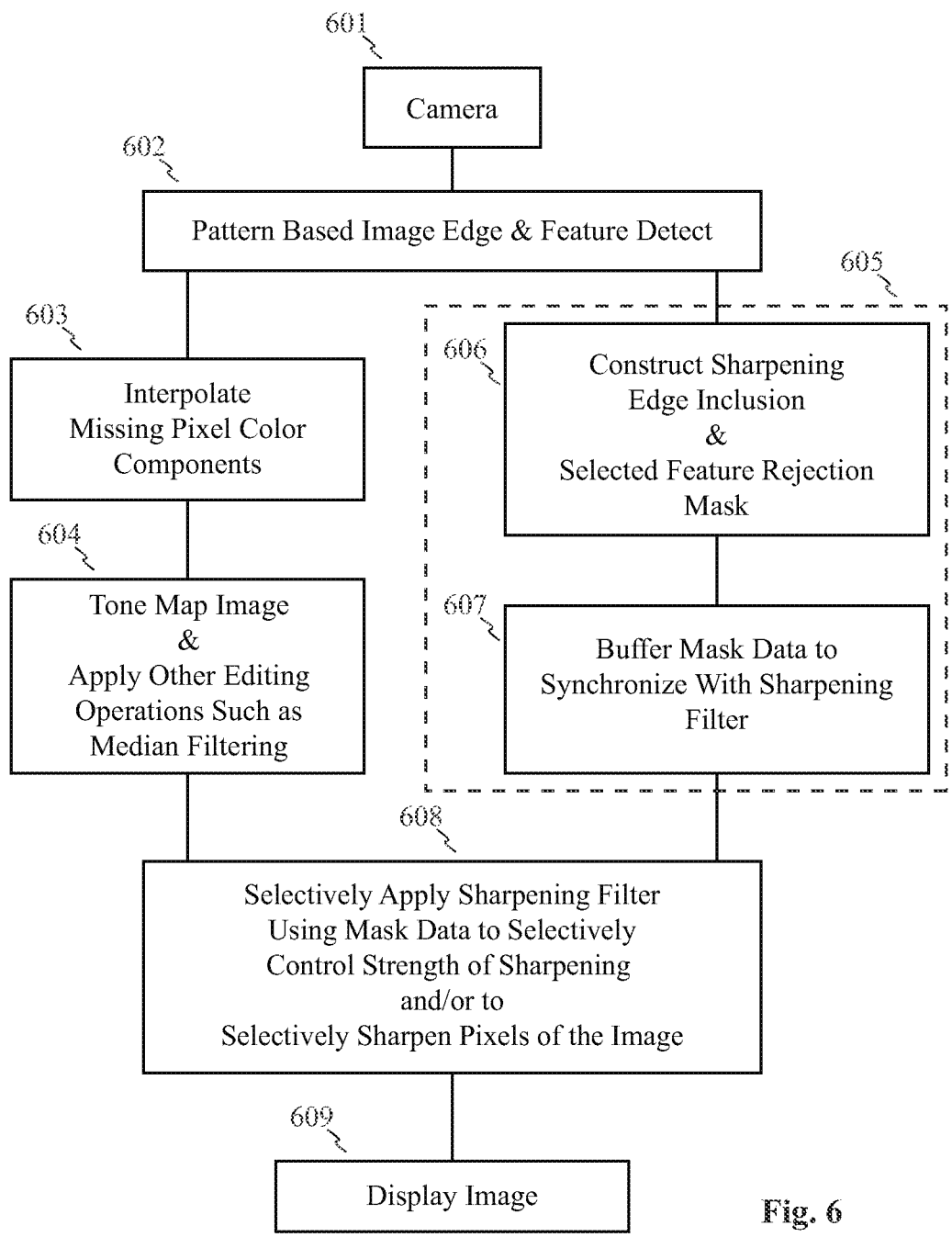
FIG. 6 is a block diagram of an imager system, in accordance with one embodiment of the present invention.

FIG. 6 depicts a system, preferably implemented using a field programmable gate array or other digital logic based device, that incorporates shared use of data that indicates the location of edges in an image and/or the location of special image features such as low contrast, very low or high pixel values, data indicative of moving edges or flashing or duty cycled lights, and/or regions of the image likely to exhibit Moiré patterns whose identification is beneficial to the choice of color interpolation algorithms and also to inclusion, exclusion or modulation of the strength or type of sharpening or smoothing algorithms applied to specific regions of an image. In a preferred embodiment, data from a high dynamic range camera 601 is communicated to a preferably pattern based edge and feature detection unit 602. Pixel data is preferably communicated in a serialized raster format and major components of the image processing are preferably arranged to operate on pixels from a relatively small region such as a 5×5 kernel to perform their designated operation.

Additionally, image processing components are preferably arranged in a pipelined configuration to perform successive operations with minimal delay once data for a designated operation is available from the camera or from a prior processing operation. This arrangement serves to generally minimize memory requirements for buffering of data and the latency between the acquisition and the display or other use of the processed image data.

In FIG. 6, identification of edges and pixel related image features 602 is preferably performed at nearly the same time as interpolation to provide missing pixel color information in 603. Pixel location related edge and feature detection data is also communicated from edge and feature detection block 602 to block 605 in which the data is arranged preferably as an image related mask to control the degree of sharpening applied to related pixels in the image. It is preferable to arrange a bit mask with bits corresponding to individual pixels of the image and use the bits as indicators to apply or inhibit sharpening at each corresponding pixel location according to the value of the bit mask. In memory buffer 607, the data is normally buffered just long enough to allow time for corresponding pixels to be subjected to interpolation 603 and tone mapping and other image processing 604. Ordering of blocks 606 to construct a sharpening edge inclusion and selected feature and 607 to buffer the data for use in sharpening is optional and is preferably arranged to minimize buffering memory requirements. Synchronized pixel data from image tone mapping and processing block 604 and sharpening mask processing and buffering block 605 are communicated to sharpening filter block 608 where the mask or alternately encoded data is utilized to modulate the degree of sharpening and/or smoothing and optionally choice of sharpening and/or smoothing algorithms. Such choices between sharpening and smoothing might follow the pattern of choices between the standard edge based algorithms and the bi-linear interpolation chosen for pixels where BL is asserted in FIGS. 3, 4, and 5. Here, for example, the edge inclusion and selected feature rejection mask may optionally be structured to explicitly indicate BL or other selected feature indications that then may be used both to inhibit sharpening and to enable filtering or smoothing routines.

After optional further processing, image data may be displayed and/or used for other control purposes at 609. Block 430 of FIG. 4 indicates a pattern of 10 green pixels used in the preferred multi-pattern edge detection for image missing pixel interpolation. Pixel interpolated color component values are calculated sequentially for image pixel locations corresponding to locations 460, 461, 462, and 463. The 5 pixel high by 4 pixel wide pattern image area is used for green filtered pixel location 461 and for interpolation at non-green filtered pixel location 462 and new patterns are detected at every other pixel location. The edge patterns detected for array depicted in 430 are used first to supply edge or other pattern information for the green filtered pixel G6 at 431 and then for non-green pixel location 462. Patterns detected and used for each site may be different. In FIG. 3 the diagonal down right, DR, and diagonal up right, UR, indications are only applied for the non-green filtered pixel location at 462 and not for green filtered pixel location 461. The same horizontal line features in the image may be detected over as many as 4 consecutive rows of pixels and the same vertical line features in the image may be detected over two consecutive operations of the edge detection circuit so when applied to both G6 pixel location and the next pixel location 462 for two consecutive operations that are two pixels apart, 4 consecutive pixels, (green, non-green, green, non-green), may be flagged as being in the vicinity of an edge. This is good since sharpening usually accentuates the brightness level on each side of the edge making the brighter side even brighter and the dimmer side even dimmer. Thus, a mask to allow pixel sharpening should span several pixels and extend at least one pixel location on either side of the edge.

Green pixel location G6 461 is toward the left side of the pattern so it was found to be preferable to also flag the next pixel location to the left (460) to enable application of sharpening at the pixel location corresponding to 460 for an edge detected in association with 461. Similarly, non-green pixel location 462 is toward the right side of the pattern so it was found to be preferable to also flag the next pixel location to the right (463) to enable application of sharpening at the pixel location corresponding to 463 for an edge detected in association with 462. For the example, lens sharpness was good so a Gaussian blur radius of one pixel or less was used for the unsharp mask. When larger blurring radii are used, it may be advantageous to increase the pixels flagged to enable sharpening in the neighborhood of a pixel for which an edge is detected and this neighborhood may extend in the vertical as well as the horizontal direction. In trials, little difference was seen on the sharpening effect on edges in the image where sharpening was desired and accentuation of noise in the image and accentuation of other image artifacts was significantly reduced by generally restricting application of sharpening to detected edges and further suppressing sharpening in areas where noise and various other artifacts would be accentuated by sharpening. It appeared that essentially the same image edge and image feature information served very well for both applications saving considerable resources in comparison to separately generating the information for interpolation and for sharpening. As indicated above, the same information may be used for image smoothing or for a combination of image smoothing and image sharpening.

A color plane of an image can be transformed by transforming each individual pixel value in the color plane by calculating the logarithm of the ratio of the individual pixel color component value to its respective luminance or luminance related value. A median filter can be applied to pixel values in the transformed color plane by replacing individual transformed pixel values with the median value of transformed pixel values of pixels in a neighborhood of the pixel being transformed. The neighborhood can be approximately centered on and can include the value of the pixel being filtered. This will be referred to as a luminance referenced median filter. In one embodiment, red and blue color planes are transformed and median filtered as indicated, and green pixel values are calculated from the pixel's luminance (Y) value and the median filtered red and blue values or G'/Y is derived from R'/Y and B'/Y. The results of tone mapping and sharpening can be performed on pixel luminance (Y) values and then applied to the median filtered and color corrected pixel color component values. Since the luminance (Y) values are preserved in the median filtering calculations, minimal side effects result from performing the tone mapping and sharpening in parallel with or during time periods that at least partially overlap median filtering operations on the same pixels.

The pixel neighborhoods used for median filtering can be in 3×3 or 5×5 neighborhoods that are centered on the pixel being filtered and filtering is preferably applied to pixels in the image that are included in the final image and for which the specified neighborhood of pixels over which the median filtering is performed is fully populated. This may exclude pixels at the border of the image that may be used with modified median filtering or without median filtering.

The logarithms of pixel color component values and of pixel luminance values are preferably calculated before dividing by luminance so that the log of the ratio may be calculated as the difference of logarithmically encoded color component and luminance values to eliminate the need to perform division operations.

The above can be implemented as a modification of embodiments also described herein. In one embodiment, the logarithm of the ratio of pixel red or blue color components to their respective green color component was used in place of the logarithm of the ratio of the pixel red or blue color component to their respective pixel luminance value as used in this implementation. It can be beneficial to clamp the ratio values at high and low threshold limits and to use the median calculation that reuses comparison results and partial comparison tallies for finding the medians for successive pixels. The median filtering operations can be performed using the same calculations and organization indicated for the green pixel referenced calculation by substituting the pixel luminance value with the green pixel value in the median filtering operation. The median filtering is still done separately for separate color planes. Optionally the color space may be transformed to other forms such as YCbCr with the Y used as luminance and the median filtering applied to log(Cr/Y) and separately to log(Cb/Y).

In high dynamic range images, pixel values may vary by more than 1000 to one even in 3×3 or 5×5 arrays of pixel values used to calculate interpolated pixel components. A portion of the interpolated values may provide reasonable representations of actual colors in the scene; but, with the large ratios of closely spaced pixels that are present in many high dynamic range images, some interpolated values deviate greatly from actual color component values in the scene. High dynamic range images tend to be marred by a sprinkling of pixels having interpolation errors that really stand out visually in the interpolated image. One exemplary benefit of the median filter is to replace a majority of the mis-interpolated pixel color component values that really stand out with values that fit visually in the image and which are in fact likely to be truer to the actual image. Two of three color components are normally supplied by interpolation at each pixel site and in many cases where there is a serious error in interpolation, one of the interpolated color components is much more seriously in error than the other. Thus, there can be benefit in performing the median filtering using color planes of actual interpolated values rather than of color values from a color space that is transformed from the one in which the image was acquired. By using color components from the color space in which the image is acquired, the color component that is seriously in error tends to be replaced directly rather than indirectly after first blending the error with multiple color components in a color space transformation. This said, the pixel values can be normalized to a luminance reference so that the median filtering is performed primarily on the color plane's chroma component while preserving the original luminance value for the pixel.

Typical prior art median filtering has been performed by subtracting a luminance component from a color value that contains combined chroma and luminance information. The use of subtraction without intentionally converting the values to logarithmic form misses the mark in processing high dynamic range images where the luminance component of pixels in the neighborhood over which the median is calculated may vary greatly. This is especially evident since the greatest benefit from median filtering is usually associated with borders of bright lights in a scene or around specular reflections from the sun in a daytime scene or at a boundary such as a window frame between regions where the ratio of brightness levels may be extreme. In these cases, contrast ratios even in small neighborhoods over which median values are selected may be very large and these are also the areas in the image that normally contain an excessive number of pixels that have interpolation errors that really stand out. Use of the ratio of the pixel value to luminance or to a luminance related value (such as green) is much more satisfactory and in most of the instances that were investigated, the use of luminance as a reference yielded better results than the use of green for the median pixel reference value. By converting the pixel and luminance related pixel related values to logarithmic form, a subtraction becomes equivalent to a division or ratio calculated in linear space so that the subtraction may be used in this distinct case to provide the equivalent of a division or a ratio in linear space. Since the logarithm of a value increases monotonically with increases in the value, the ranking and, thus, the selection provided by the median filter remains substantially unchanged when logarithmically encoded pixel related values are subjected to median filtering in place of linearly encoded pixel related ratios. Thus, the use of logarithmically encoded values can serve primarily to permit substitution of subtraction for division to obtain an indication of the ratio without substantially changing the result of the filtering.

In the alternate embodiment, green pixel values were used as a pseudo luminance reference. In one embodiment, luminance values replace the green pixel values in the ratios and after the median filtering operation the green pixel value is preferably calculated from the original pixel luminance and the median filtered red and blue filtered pixel values so that the pixel luminance rather than the pixel green value remains unchanged by the median filtering operation.

The effectiveness of the filtering in replacement of errantly interpolated pixel color component values with ones that fit the image is generally improved by using pixel luminance values rather than green pixel component values in the median filtering operation. A second exemplary advantage is that the same logarithm of the luminance is used for a tone mapping operation that can be performed at the same time as the median filtering. The same logarithmically encoded luminance values may be used for both the tone mapping and the median filtering operations and since the pixel luminance values remain constant in the luminance referenced median filtering operation, the errors introduced by having the luminance values altered in the median filter so that they no longer match those used in the tone mapping are eliminated.

Figure 7:
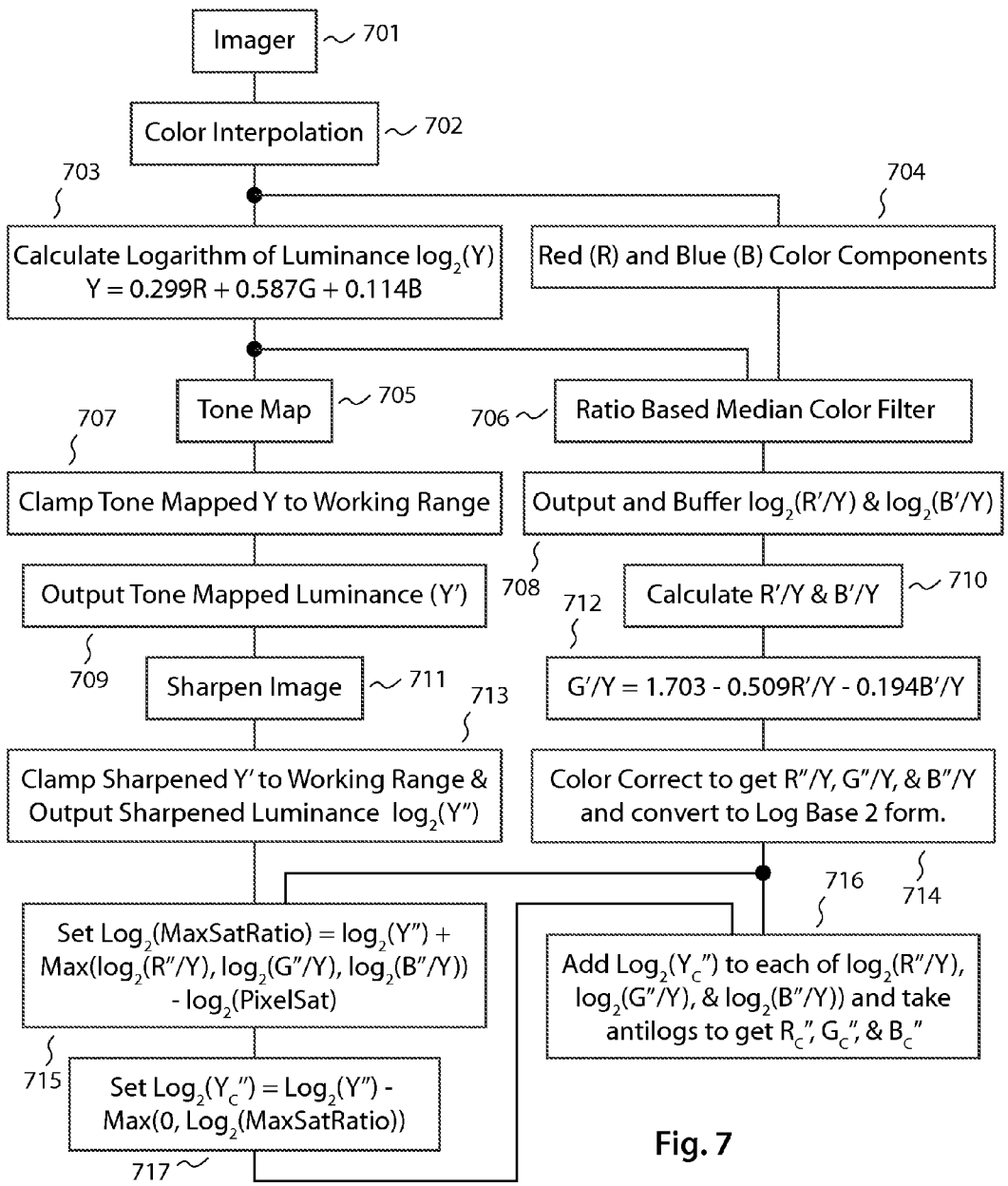
FIG. 7 is a diagram illustrating a relationship of the luminance referenced median color filter in accordance with one embodiment of the present invention to other high dynamic range image processing operations that are performed on the image.

FIG. 7 is a diagram that depicts the relationship of the luminance referenced median color filter in accordance with one embodiment to other high dynamic range image processing operations that are performed on the image. Pixel values from high dynamic range camera 701, after optional processing for color balance and color temperature are interpolated to provide missing color components 702 and the logarithms of the pixel luminance values are calculated 703. The logarithms of luminance values are provided for tone mapping 705 and for the median based color filter 706 which also uses red and blue color components that are provided from the color interpolation block 702. Following tone mapping 705, the tone mapped pixel luminance values can be clamped 707 so that they are non-negative and so that they are further restricted to the numerical working range that is provided. The working range preferably includes the luminance values that are not likely to result in saturation of the pixel in further processing stages. The clamped, tone mapped values can be sharpened 711 and again clamped 713 to a non-negative working range that can include the pixel values that are not likely to saturate in further pixel processing stages. In a processing path that can be executed while tone mapping and sharpening operations are executed for the same rows of pixels, the logarithm of the luminance 703 and corresponding pixel color components 704 are filtered by median filter 706 and the median filtered color components can be expressed in logarithmic form as the ratios of the median filtered values R' and B' to the pixel luminance $\log_2(R'/Y)$ and of $\log_2(B'/Y)$ are buffered 708 to synchronize their use with color correction and additionally with completion of tone mapping and sharpening that is performed on luminance values for the corresponding pixels. Just prior to color preservation and recombination with the tone mapped and sharpened pixel luminance value $Y_C''$ in blocks 715, 716, and 717, the antilogarithms of $\log_2(R'/Y)$ and of $(\log_2(B'/Y))$ can be calculated to obtain R'/Y and B'/Y (710) and G'/Y can be derived from them (712). G'/Y can be clamped so that it is non-negative and the range may be further restricted to represent a practical range for the G'/Y color component value. This intermediate clamping operation before color correction may be of benefit and may justify calculation and clamping of the green color component before performing color correction so some pixel saturation is still to be expected and often distorts colors in or bleaches portions of the directly viewed lights in the scene. Color correction 714 is performed to obtain color corrected color to luminance ratios R"/Y, G"/Y, and B"/Y to obtain color corrected pixel color component values. Alternatively, the derivation of G'/Y (712) may be combined with the color correction calculation 714. As part of color correction, the values can be clamped to positive, non-zero values and converted to a logarithmic form.

With a camera 701 having a very high dynamic range, color data is captured for most lights even when they are in direct view. Even though tone mapping normally preserves most of the dynamic range of the captured image, it is based on locally averaged luminance and does not include the effects of sharpening, color correction, and the fact that individual pixel color components expressed in the RGB color space often have pixel color component values that exceed the luminance values. Color is preserved by obtaining the value of each pixel's maximum color component and taking its ratio to the saturation value (e.g., the maximum display level) for the pixel color component. If the ratio is greater than one indicating that it exceeds the saturation level, substantially all of the color components of the pixel can be divided by the ratio so that the maximum color component in the scaled pixel value just matches the output saturation level resulting in proper display of the color component. This can be especially beneficial for automotive visual display or for color based processing of the images for automotive use in order to preserve the color of lights and bright signs and markings that are given special safety related interpretations. The visual appeal of the image is also enhanced.

The numerous multiply and divide operations that are used in the color preservation may be more efficiently performed by converting the pixel related luminance and color component values to logarithmic form so that multiplies and divides are replaced by adds and subtracts, respectively, and comparison orders are preserved with the ratio of one in linear space represented by a logarithmic value of zero. Thus, the logarithm of luminance is provided as the sharpened pixel luminance output value $\log_2(Y''')$ (Block 713) and the logarithmically encoded color corrected color component values expressed as ratios to pixel luminance $\log_2(R''/Y)$, $\log_2(G''/Y)$, and $\log_2(B''/Y)$ are provided by block 714 after median filtering, calculation of G'/Y and color correction. In other embodiments, the tone mapping operation output was in the form of pixel luminance modification factors, Y'/Y and the original pixel RGB color values can be multiplied by this factor to obtain the tone mapped pixel color component values. With Y available in the tone mapping and unchanged by the luminance ratio based color median filter, an output of the tone mapping operation for the embodiment of FIG. 7 can be to provide the tone mapped luminance value Y' in place of the ratio Y'/Y. Y' may be directly input to the sharpening filter without the necessity to obtain tone mapped values of R, G, and B and then calculate a new luminance value from them. Secondly, the modified median filter operates on the logarithm of the ratio of a selected pixel color component to its luminance and serves to find the median value of the logarithmically encoded color to luminance ratios in the specified neighborhood of the target pixel and to replace the logarithmically encoded color component to luminance ratio of the pixel color component being filtered with the median value to provide the essential step of the color median filtering operation. As with another embodiment, the logarithm of the color ratio can be clamped between positive and negative limits that need not be values of equal magnitude to represent a practical range for the color to luminance ratios. The limits can be modified since the luminance can be used in place of green for the denominator term of the ratio. The clamped, logarithmically encoded median filtered red and blue color ratios to original pixel luminance after clamping are the values that can be buffered. For example, the value used for Y in the examples is calculated using Y=0.299R+ 0.587G+0.114B so the ratios should never be higher than about 8.8 for blue, 3.3 for red and 1.7 for green. Since few colors in nature or in safety related indicators are pure blue, it may be reasonable to limit the integral portion to three bits to include values just under 8 and to include more of the range for fractional values and to add accuracy. The limiting needs to be repeated more often if done before finding median values but this has the benefit of restricting the bit width of compare circuits used to find the median values.

The systems and methods described herein can be implemented using a non-transitory computer readable medium having stored thereon software instruction that, when executed by a processor, cause the processor to display a captured image on a display having a lower dynamic range than the imaging system by executing one or more steps.

Examples of high dynamic range imagers that can be used are described in United States Patent Application Publication Numbers US 2008/0192132 A1, US 2009/0256938 A1, US 2009/0160987 A1, US 2009/0190015 A1, US 2010/0187407 A1, and US 2010/0188540 A1, all entitled "IMAGING DEVICE," the entire disclosures hereby being incorporated herein by reference.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An imaging system configured to display a captured image on a display having a lower dynamic range than the imaging system, the imaging system comprising:
 a high dynamic range imager configured to capture at least one high dynamic range image; and
 a processing device communicatively connected to said high dynamic range imager, wherein said processing device is configured to:
  reduce color speckles caused by errant interpolated pixel values using a median filter, reduce occurrence of errant values of alternate color while maintaining at least one of sharpness detail and edge detail, smooth color rendering in a displayed image, rank each element of an array with respect to an ordering criterion and select a median element, where the median element is a function of a ratio of a non-reference color component of a pixel to a reference color component of the pixel, wherein said ordering criterion comprises a discrete ranking value assigned to every element, and sort elements with equal values in a prescribed sequence so each element has a rank that is unique within a set, wherein a middle element is always specified.

2. The imaging system of claim 1, wherein said processing device comprises a field programmable gate array.

3. The imaging system of claim 1, wherein the display of said imaging system replaces an interior rearview mirror in a vehicle.

4. The imaging system of claim 1, wherein said processing device is configured to find a median from a set of pixel related values and provide an enhanced pixel metric based at least partially upon modified ratios of pixel color component to at least one of pixel color component and luminance values.

5. The imaging system of claim 4, wherein said ratio calculation is performed using a logarithmic representation of color components.

6. The imaging system of claim 4, wherein said processing device comprises a field programmable gate array.

7. The imaging system of claim 4, wherein the display of said imaging system replaces an interior rearview mirror in a vehicle.

8. The imaging system of claim 1, wherein said discrete ranking of equal pixel values is based upon at least one of an order of entry into said array and a position within said array of compare values.

9. The imaging system of claim 1, wherein said processing device is configured to filter successive pixels so pixel related values introduced into a neighborhood of pixels over which a median or value of designated rank is chosen are used with related comparison results.

10. The imaging system of claim 9, wherein said processing device is further configured such that comparisons are organized so only pixel related elements in subsets are newly introduced to an array and are compared against other pixel related elements in said array.

11. The imaging system of claim 9, wherein said processing device is further configured to compare results obtained once and used in finding said median or said value of designated rank for more than one pixel in an array.

12. The imaging system of claim 9, wherein said processing device comprises a field programmable gate array.

13. The imaging system of claim 9, wherein the display of said imaging system replaces an interior rearview mirror in a vehicle.

14. The imaging system of claim 1, wherein said processing device is configured to use a second derivative term calculated from one of a red pixel and a blue pixel for interpolation of a green pixel.

15. A non-transitory computer readable medium having stored thereon software instructions that, when executed by a processor, cause the processor to control a high dynamic range imager to capture an image and to display the captured image on a display having a lower dynamic range than the imager, by executing the steps comprising:

(a) capturing at least one high dynamic range image;

(b) reducing color speckles caused by errant interpolated pixel values using a median filter, reducing occurrence of errant values of alternate color while maintaining at least one of sharpness detail and edge detail, and smoothing color rendering in a displayed image;

(c) ranking each element of an array with respect to an ordering criterion and selecting a median element, where the median element is a function of a ratio of a non-reference color component of a pixel to a reference color component of the pixel, wherein said ordering criterion comprises a discrete ranking value assigned to every element; and (d) sorting elements with equal values in a prescribed sequence so each element has a rank that is unique within a set, wherein a middle element is always specified.

16. The non-transitory computer readable medium of claim 15, wherein said processing device comprises a field programmable gate array.

17. The non-transitory computer readable medium of claim 15, wherein the display replaces an interior rearview mirror in a vehicle.

18. The non-transitory computer readable medium of claim 15, wherein the software instructions further cause the processor to execute the step of:

(e) finding a median from a set of pixel related values and providing an enhanced pixel metric based at least partially upon modified ratios of pixel color component to at least one of pixel color component and luminance values.

19. The non-transitory computer readable medium of claim 18, wherein said ratio calculation is performed using a logarithmic representation of color components.

20. The non-transitory computer readable medium of claim 18, wherein said processing device comprises a field programmable gate array.

21. The non-transitory computer readable medium of claim 18, wherein the display replaces an interior rearview mirror in a vehicle.

22. The non-transitory computer readable medium of claim 15, wherein said discrete ranking of equal pixel values is based upon at least one of an order of entry into said array and a position within said array of compare values.

23. The non-transitory computer readable medium of claim 15, wherein the software instructions further cause the processor to execute the step of:

(e) filtering successive pixels so pixel related values introduced into a neighborhood of pixels over which a median or value of designated rank is chosen are used with related comparison results.

24. The non-transitory computer readable medium of claim 23, wherein said processing device is further configured such that comparisons are organized so only pixel related elements in subsets are newly introduced to an array and are compared against other pixel related elements in said array.

25. The non-transitory computer readable medium of claim 23, wherein said processing device is further configured to compare results obtained once and used in finding said median or said value of designated rank for more than one pixel in an array.

26. The non-transitory computer readable medium of claim 23, wherein said processing device comprises a field programmable gate array.

27. The non-transitory computer readable medium of claim 23, wherein the display replaces an interior rearview mirror in a vehicle.

28. The non-transitory computer readable medium of claim 15, wherein the software instructions further cause the processor to execute the step of:
  (e) using a second derivative term calculated from one of a red pixel and a blue pixel for interpolation of a green pixel.

* * * * *